United States Patent [19]

Rosenbaum et al.

[11] 3,781,569
[45] Dec. 25, 1973

[54] FAST TIME CONSTANT CIRCUIT MEANS USING TIME DISCRIMINATION TECHNIQUES

[75] Inventors: Erik Rosenbaum, Randallstown; John Waldo Martin, Joppa, both of Md.

[73] Assignee: The Bendix Corporation, Southfield, Mich.

[22] Filed: Feb. 23, 1972

[21] Appl. No.: 228,550

[52] U.S. Cl. ............... 307/234, 307/230, 307/293, 328/56, 328/110, 328/112, 328/145, 343/5 R
[51] Int. Cl. ............................................. H03k 5/20
[58] Field of Search ................. 307/234, 208, 293; 328/55, 56, 109–112, 142–145; 343/5 R, 7 A

[56] References Cited
UNITED STATES PATENTS

| | | |
|---|---|---|
| 3,299,271 | 1/1967 | Stites ............................ 307/234 X |
| 3,132,263 | 5/1964 | Maass ............................ 328/112 X |
| 2,841,710 | 7/1958 | Marschall ........................ 328/112 |
| 2,879,504 | 3/1959 | Howell et al. .................. 328/112 X |
| 3,036,272 | 5/1962 | Vezu ................................ 328/56 X |
| 3,046,483 | 7/1962 | Breskend ........................ 307/234 X |
| 3,226,570 | 12/1965 | Rosenbaum ................... 307/234 X |

*Primary Examiner*—Stanley D. Miller, Jr.
*Attorney*—Bruce L. Lamb et al.

[57] ABSTRACT

A fast time constant circuit includes a delay line which receives video radar returns. Two delay line time spaced taps are connected through an AND gate to an integrator, the output of which is applied to one input of a differential amplifier. An intermediate delay line tap is connected directly to the second differential amplifier input. The filtered video radar returns appear at the output of the differential amplifier.

4 Claims, 4 Drawing Figures

PATENTED DEC 25 1973        3,781,569

FAST TIME CONSTANT CIRCUIT MEANS USING TIME DISCRIMINATION TECHNIQUES

BACKGROUND OF THE INVENTION

This invention relates to circuits for providing fast time constant treatment to a log receiver video radar returns and more particularly to fast time constant circuits which attenuate radar target return pulses passing therethrough by only a relatively small amount.

Radar interference in the form of amplitude or frequency modulated C-W carries having a frequency close to the radar carrier frequency will normally result in interference at the radar receiver. In the art this type of modulation has been eliminated by inserting a high pass filter generally between the second detector and the first video stage in the radar receiver. The high pass filter when used for this purpose is called a fast time constant circuit (FTC). It is well known that this type of filter removes some of the desired signal energy as well as the interfering modulation so that target return video signals are passed by the FTC filter with some amount of attenuation.

SUMMARY OF THE INVENTION

A new FTC circuit is described herein which provides improved signals through time discrimination techniques. The circuit includes a delay line to which video radar returns are applied to thus store the video signals so that various time delay video representations of the original video signal are available. An integrator generates an upward ramping error signal whenever delay line output signals appear simultaneously at two relatively widely time separated output taps, indicative of a relative long video signal. The error signal is subtracted from the video signal obtained from a tap intermediate with respect to the above mentioned taps. When a relatively long input video signal is applied to the FTC circuit the trailing portion of the video signal is attenuated as described above. However, a relatively short input video signal passes through the FTC circuit relatively unattenuated over its whole duration.

It is an object of this invention to provide a fast time constant circuit for use in logarithmic radar receiver.

It is another object of this invention to provide an FTC circuit of the type described which permits relatively short radar pulses to pass therethrough relatively unattenuated.

BRIEF DESCRIPTION OF THE DRAWINGS

FIGS. 2 and 3 are used to illustrate the operation of the invention.

DESCRIPTION OF THE PREFERRED EMBODIMENT

Figure 1:
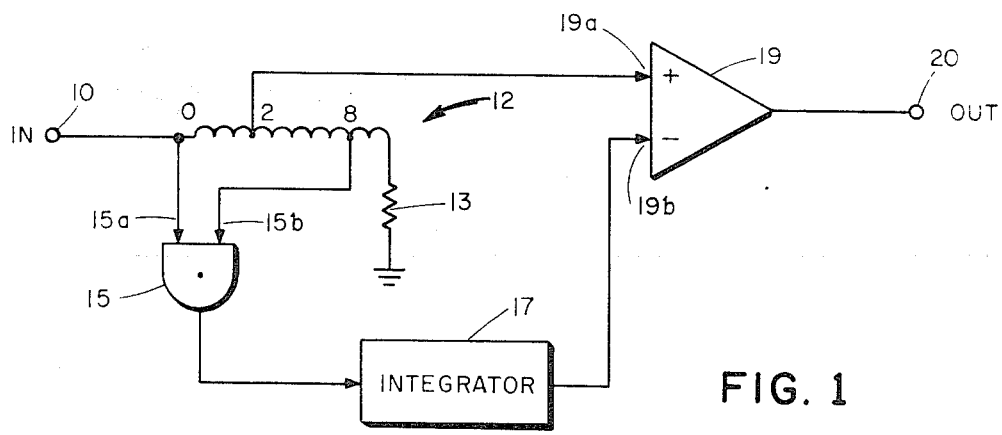
FIG. 1 is a modified block diagram of the invention.

Referring to the figures wherein like reference numerals refer to like elements and in particular referring to FIG. 1, logarithmic radar receiver video signals are applied at terminal 10 which is the input terminal to a delay means, suitably a delay line, 12. The delay line has time spaced output taps at 0, 2 and 8 microseconds, respectively, for example and is terminated by resistor 13 having one end connected to ground. The 0 and 8 microsecond output taps are applied respectively as inputs 15a and 15b to AND gate 15. The output from AND gate 15 comprises a two state signal, either a base voltage signal, suitably ground, when the gate is closed or a relatively higher voltage signal when the gate is opened. The gate output signal is integrated by integrator 17 which thus generates an error signal which is applied to input tap 19b of differential amplifier 19. The delay line 2 microsecond output tap is applied directly to input terminal 19a of differential amplifier 19. The amplifier performs a differential operation with its output signal at terminal 20 comprising the output of the fast time constant circuit.

Figure 2:
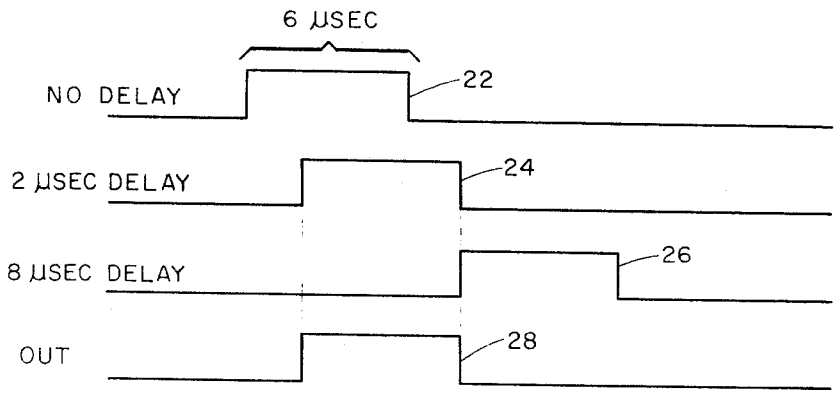
FIG. 2 includes time graphs of a relatively short radar video signal as it appears at various points in the circuit of FIG. 1.

FIG. 2 shows time graphs of a relatively short radar video signal at various points in the circuit of FIG. 1 and reference should also be made now to that figure. The radar video signal 22 has a basic duration of 6 microseconds and is shown as a rectangular pulse for convenience. Pulse 22 will be applied to input 15a of AND gate 15. Two microseconds later the leading edge of the pulse, now represented as pulse 24 arrives at the 2 microsecond delay line output tap. It will be remembered that this output tap is connected directly to one input of the differential amplifier 19, and since AND gate 15 is now closed so that the integrator 17 is generating no error signal the pulse 24 will pass directly through the differential amplifier relatively unattenuated. Eight microseconds after the pulse represented at 22 arrives at the delay line input tap the leading edge of the pulse now represented at 26, arrives at the 8 microsecond output tap. However, this is after the pulse represented at 22 and 24 has terminated so that gate 15 remains closed and the pulse represented at 24 has passed through the differential amplifier unattenuated.

Figure 3:
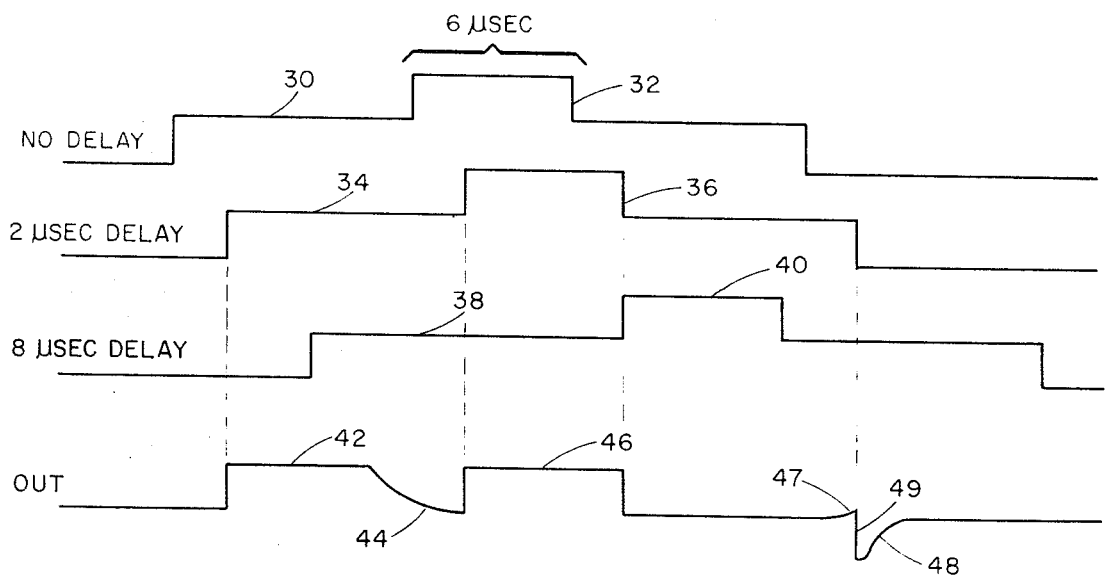
FIG. 3 includes various time graphs of a relatively short video signal superimposed thereon as these pulses would appear at various points in the circuit of FIG. 1.

Refer now to FIG. 3 wherein a radar return video signal 30 representing weather or other undesired interferring modulation has superimposed thereon a relatively short video signal 32, assumed to be 6 microseconds long, representing a target. The pulses 30 and superimposed pulse 32 represent the pulse appearing at the AND gate input tap 15a. After a delay of 2 microseconds the pulse, now represented at 34 and 36, appears at the 2 microsecond output terminal and is applied to input terminal 19a of differential amplifier 19. Since gate 15 is at this time closed, the leading portion of the pulse passes through amplifier 19 relatively unattenuated and appears at terminal 20 and is represented in FIG. 3 as pulse 42. Eight microseconds after the pulse represented at 30 appeared at the input to the delay line the leading edge of the pulse represented at 38 appears at gate input terminal 15b. The gate thus opens so that integrator 19 begins to generate an upward ramping error signal which is applied to terminal 19b thus causing pulse 42 to ramp downwards towards the base line as represented by downward sloping line 44 at the trailing edge of pulse 42. Subsequently, the leading edge of target pulse 32 arrives at the delay line input tap and is applied directly to gate input terminal 15a. Two microseconds later the leading edge of the target pulse now represented at 36 arrives at the 2 microsecond delay line output tap and is applied to the differential amplifier and passes directly therethrough onto terminal 20 since no additional error signal corresponding to the target pulse can be generated by integrator 17. Thus, the target pulse, now represented at 46, will appear at terminal 20.

At the trailing edge of the pulse represented at 30 gate 15 closes and the error signal generated by integrator 17 is rapidly extinguished. Since the pulse at terminal 19a will remain on for an additional 2 microseconds, the output at terminal 20 will ramp upward somewhat above the base line as represented by signal 47 of FIG. 3. Because of pulse rise time constraints signal 47 is normally of insignificant amplitude. At the trailing edge of the pulse represented at 34 the input signal at terminal 19a disappears producing the sharp transition 49 of FIG. 3 and pulse 48, which is below the base line, appears at terminal 20. In FIG. 3 pulses 42 and 47 appear as noise resulting from the relatively long interference pulse 34. The undesired pulse 48 can easily be moved by means of a clipper diode as will be explained below.

Figure 4:
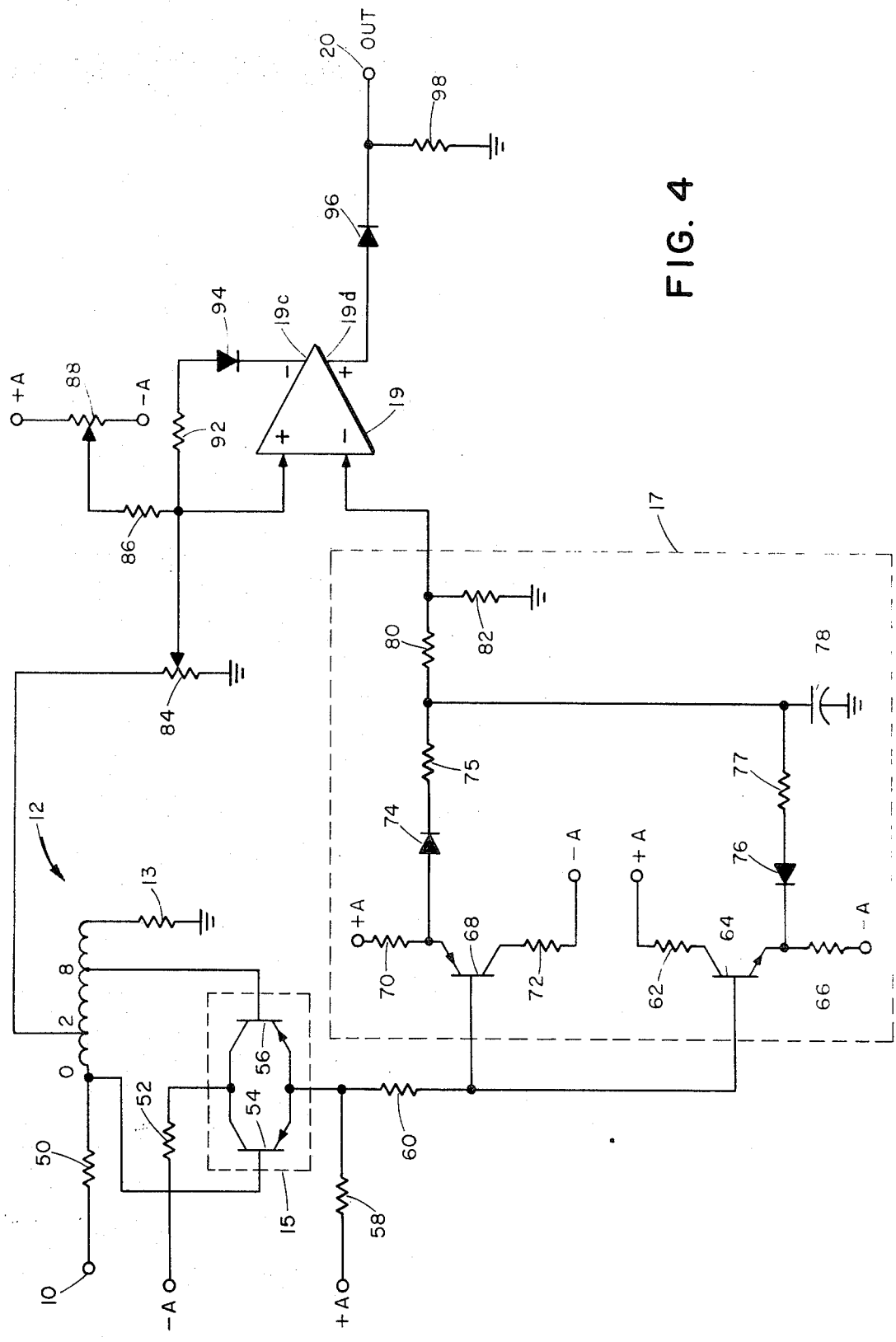
FIG. 4 is a modified schematic of the invention.

Refer now to FIG. 4 where input tap 10 is seen to be connected through resistor 50 to the input of delay line 12. As before, the delay line is terminated through resistor 13 to ground. AND gate 15 is seen to be comprised of PNP transistors 54 and 56 connected with common emitters and common collector electrodes respectively. The inputs to the AND gate are at the base electrodes of these transistors, where the base electrode of transistor 54 is connected to the zero delay output tap of delay line 12 and the base electrode of transistor 56 is connected to the 8 microsecond delay output tap. The common collector electrodes are connected through resistor 52 to a source of negative voltage —A while the common emitter electrodes are connected through resistor 58 to a source of positive voltage +A.

Integrator 17 is comprised of NPN transistor 64, PNP transistor 68 together with capacitor 78 and diodes 74 and 76. The base electrodes of transistors 64 and 68 are connected in common and through resistor 60 to the commonly connected emitter electrodes of transistors 54 and 56. The collector-emitter circuit of transistor 64 is connected together with resistors 62 and 66 across the positive and negative voltage sources. The collector-emitter circuit of transistor 68 is connected together with resistors 70 and 72 in like manner across the positive and negative voltage sources. The emitter electrode of transistor 64 is connected through diode 76 and resistor 77 to a first plate of capacitor 78 whose other plate is grounded. In like manner, the emitter electrode of transistor 68 is connected through diode 74 and resistor 75 to the same first plate of capacitor 78. The capacitor is connected through resistor 80 to the inverting input terminal of differential amplifier 19. The inverting input terminal is also connected through resistor 82 to ground. Resistors 80 and 82 comprise a voltage divider for the signal at capacitor 78.

The 2 microsecond output tap of delay line 12 is connected through the gain adjust potentiometer 84 to the non-inverting input terminal of amplifier 19.

The operation of the circuit is now described. Assume first that no radar video signal is present in the circuit. The signals at the base electrodes of transistor 54 and 56 are now at some base reference level, suitably ground. The voltage at the common emitter electrodes of transistors 54 and 56 is thus equal to one diode drop, assumed in this description to be approximately 0.6 volts. This small positive voltage appears at the base electrodes of transistors 64 and 68. Thus, a small positive voltage corresponding to the voltage across one diode appears across capacitor 78 due to the AND gate transistors and the serial connection of the base-emitter junction of transistor 64 in series with diode 76 and the base-emitter junction of transistor 68 in series with diode 74. This small voltage across capacitor 78 is compensated for by adjustment of potentiometer 88. Upon the appearance on a relatively long video pulse at terminal 10, corresponding to interference, gate 15 will remain closed for the first 8 microseconds so that the first 6 microseconds of the interference video signal will pass relatively unattenuated through amplifier 19. However, after 8 microseconds gate 15 opens, that is, both transistors 54 and 56 become back biased so that the voltage at the base electrodes of transistors 64 and 68 rises. Transistor 68 is thus biased hard off and transistor 64 is biased on so that the voltage at the emitter electrodes of both these transistors rises towards the positive voltage source level. Diode 76 is thereby back-biased while diode 74 is forward-biased so that current flows from the +A source through diode 74 to capacitor 78 generating an upward ramping voltage signal across that capacitor. The charging time constant for capacitor 78 is determined basically by the capacitance of that capacitor and the serial resistance of resistors 70 and 75. This charging time constant is made relatively long, on the order of 15 microseconds for the embodiment here described. As previously mentioned, the voltage across capacitor 78 is applied through the voltage divider comprised of resistors 80 and 82 to the inverting terminal of amplifier 19. In this manner, the latter portion of a relatively long video signal is attenuated.

Amplifier 19 includes a feedback circuit comprised of diode 94 serially connected with resistor 92. As aforementioned offset compensation is provided by adjustment of potentiometer 88 which is connected together with resistor 86 to the non-inverting input terminal of amplifier 19. In addition, the potentiometer windings are connected in parallel across the positive and negative voltage sources. Proper adjustment of potentiometer 88 produces a positive voltage equivalent to one diode drop at output 19b. The quiescent output voltage compensates for the drop across clipper diode 96 which is used to remove output signals such as 48 of FIG. 3 which are below the base reference line. A load resistor 98 is provided between output terminal 20 and ground.

At the time the signal at the "no delay" output tap is extinguished transistor 54 become conductive so that gate 15 opens and the voltage at the base electrodes of transistors 64 and 68 drops to approximately 0.6 volts, equivalent to one diode voltage drop. Diode 74 thus becomes back-biased while diode 76 is forward-biased due to the signal now impressed across capacitor 78. This signal now bleeds off through diode 76 and resistors 66 and 77. The discharge of the capacitor is determined basically by the value of the capacitance 78 and resistors 66 and 77. The capacitor discharge time constant is made relatively shorter than the capacitor charge time constant, the discharge time constant of this embodiment being on the order of 2 microseconds. The reason for the short discharge time may be seen by considering pulse 48 of FIG. 3 which will be removed by clipper diode 96 of FIG. 4. Any radar target signals received during the period of pulse 48 will be removed together with pulse 48 by clipper diode 96 and hence will be lost. It is thus desirable that pulse 48 be kept as short as possible. This is accomplished by the short discharge time constant.

The invention claimed is:

1. A fast time constant circuit comprising:

delay means having at least first, second and third time spaced output taps, said second tap being intermediate said first and third taps;

means having two signal input ports for generating an output signal which is proportional to the difference of the signals applied at said two input ports;

means for connecting said second delay means output tap to one of said input ports;

first means responsive during the simultaneous occurrence of signals at said first and third delay means output tap for generating a ramping error signal from a base reference toward a maximum value;

second means responsive to the subsequent non-occurrence of at least one of the signals at said first and third delay means output taps for causing said error signal to decay toward said base reference; and, means for applying said error signal to the other of said input ports.

2. The fast time constant circuit of claim 1 wherein the rate at which said ramping error signal increases from the base reference toward its maximum value is different from the rate at which said ramp error signal subsequently returns to said base reference.

3. A fast time constant circuit comprising:

delay means having at least first, second and third time spaced output taps, said second tap being intermediate said first and third taps;

means having two signal input ports for generating an output signal which is proportional to the difference of the signals applied at said two input ports;

means for connecting said second delay means output tap to one of said input ports;

a charge storage means connected to the other of said input ports;

first means responsive to the simultaneous occurrence of signals at said first and third delay means output taps for supplying charges to said charge storage means at a first rate; and, second means responsive to the subsequent non-occurrence of at least one of the signals at said first and third delay means output taps for removing charges from said charge storage means.

4. The fast time constant circuit of claim 3 wherein said first and second means comprises:

a gate for normally generating a first signal and for generating a second signal in response to the simultaneous occurrence of signals at said first and third delay means output taps;

a supply of charges connected to said charge storage means in response to said second signal; and, a charge sink connected to said charge storage means in response to said first signal.

* * * * *